(12) United States Patent
Ralph

(10) Patent No.: US 8,961,784 B2
(45) Date of Patent: Feb. 24, 2015

(54) PLUGS FOR REPAIRING SIFTING OR FILTERING SCREENS

(75) Inventor: Andrew Ralph, Lothian (GB)

(73) Assignee: M-I Swaco, Houston, TX (US)

(*) Notice: Subject to any disclaimer, the term of this patent is extended or adjusted under 35 U.S.C. 154(b) by 1147 days.

(21) Appl. No.: 12/668,455

(22) PCT Filed: Jul. 1, 2008

(86) PCT No.: PCT/GB2008/050528
§ 371 (c)(1),
(2), (4) Date: Mar. 29, 2010

(87) PCT Pub. No.: WO2009/013522
PCT Pub. Date: Jan. 29, 2009

(65) Prior Publication Data
US 2010/0201081 A1  Aug. 12, 2010

(30) Foreign Application Priority Data
Jul. 25, 2007 (GB) .................. 0714511.3

(51) Int. Cl.
*B07B 1/46* (2006.01)
*B01D 35/30* (2006.01)
*B29C 45/16* (2006.01)

(52) U.S. Cl.
CPC ............ *B07B 1/4627* (2013.01); *B29C 45/16* (2013.01)
USPC ............ 210/232; 209/399; 209/403; 209/405

(58) Field of Classification Search
USPC .......... 210/232, 499; 209/659, 401, 403, 399, 209/405
See application file for complete search history.

(56) References Cited

U.S. PATENT DOCUMENTS

| | | | | |
|---|---|---|---|---|
| 1,749,755 A * | 3/1930 | Downer | ............. | 245/2 |
| 3,261,393 A * | 7/1966 | Templeton | ............. | 160/237 |
| 5,137,622 A * | 8/1992 | Souter | ............. | 209/403 |
| 5,275,293 A * | 1/1994 | Crider | ............. | 209/319 |
| 5,490,598 A * | 2/1996 | Adams | ............. | 209/401 |
| 5,797,975 A * | 8/1998 | Davis | ............. | 55/493 |
| 5,988,397 A * | 11/1999 | Adams et al. | ............. | 209/401 |
| 6,029,824 A * | 2/2000 | Adams | ............. | 209/401 |
| 6,267,247 B1 * | 7/2001 | Seyffert et al. | ............. | 209/403 |
| 6,401,934 B1 * | 6/2002 | Largent et al. | ............. | 209/401 |
| 6,872,466 B2 * | 3/2005 | Robertson et al. | ............. | 428/608 |
| 6,886,697 B2 * | 5/2005 | Russell et al. | ............. | 209/399 |
| 6,956,168 B2 * | 10/2005 | Herth | ............. | 174/53 |
| 6,983,849 B1 * | 1/2006 | Toler et al. | ............. | 209/659 |
| 7,914,009 B1 * | 3/2011 | Gerspach | ............. | 277/609 |

(Continued)

OTHER PUBLICATIONS

International Search Report for PCT/GB2008/050528, mailed Jul. 20, 2009.

(Continued)

*Primary Examiner* — Vishal Patel
*Assistant Examiner* — Nicholas L Foster
(74) *Attorney, Agent, or Firm* — Patents + TMS, P.C.

(57) ABSTRACT

There is provided a plug (1) for repairing a sifting or filtering screen, the plug having at least one line of weakening (5) which can be ruptured whereby the plug has a plurality of possible plug sizes so that the plug is capable of plugging at least two different sizes of cell of the screen. Each possible plug size has a seal (2) extending around the complete periphery of the chosen plug size, in use the seal serving to engage and seal against the screen in order to plug a cell aligned with a damaged area of the screen.

13 Claims, 4 Drawing Sheets

(56) References Cited

U.S. PATENT DOCUMENTS

| | | | |
|---|---|---|---|
| 2002/0088532 A1* | 7/2002 | Cook et al. | 156/163 |
| 2002/0088747 A1* | 7/2002 | Cook et al. | 210/499 |
| 2011/0094950 A1* | 4/2011 | Dahl | 210/85 |

OTHER PUBLICATIONS

Written Opinion of the International Searching Authority for PCT/GB2008/050528, mailed Jul. 20, 2009.

* cited by examiner

PLUGS FOR REPAIRING SIFTING OR FILTERING SCREENS

This application is the U.S. national phase of International Application No. PCT/GB2008/050528 filed 1 Jul. 2008 which designated the U.S. and claims priority to GB Application No. 0714511.3 filed 25 Jul. 2007, the entire contents of each of which are hereby incorporated by reference.

FIELD OF THE INVENTION

This invention relates to plugs for repairing sifting or filtering screens, particularly screens used in the oil drilling industry for separating solids from the liquid phase of oil and water-based muds retrieved from drilling operations.

BACKGROUND TO THE INVENTION

U.S. Pat. No. 6,872,466 discloses a method of repairing a damaged sifting or filtering screen having an outer frame across which the filtering mesh is stretched. Within the frame a rectangular grid of ribs divides the filtering area into an orthogonal array of cells. Damage to the mesh is repaired by snap-fitting a plastics plug into the cell underlying the damaged area of the mesh. This repairs the screen by plugging the cell and preventing any material passing through that cell. Cell sizes differ from screen to screen, and also within the same screen. Providing plugs of different sizes to suit differing cell sizes requires expensive mould tools, a disadvantage which the present invention aims to overcome.

SUMMARY OF THE INVENTION

According to the invention, there is provided a plug for repairing a sifting or filtering screen, the plug having at least one line of weakening which can be ruptured whereby the plug has a plurality of possible plug sizes so that the plug is capable of plugging at least two different sizes of cell of the screen.

In the preferred embodiment, the plug has two parallel lines of weakening, giving three possible plug sizes, but it will be appreciated that any number of lines of weakening can be incorporated, to enable plug length, plug width or a combination of plug length and plug width to be selected in order to match the shape and size of a particular cell of the screen.

Preferably, the plug comprises a plastics body and the or each line of weakening is defined by a thin web ruptured by a manual snapping action.

Each possible plug size may have a seal extending around the complete periphery of the chosen plug size, in use the seal serving to engage and seal against the screen in order to plug a cell aligned with a damaged area of the screen. The plug may have a body of a first plastics material supporting an area of a second plastics material which provides the seal and is more resilient than the first material. The body and seal are preferably formed by co-moulding.

Also, each possible plug size may have holes for the passage of securing members such as screws, the holes being positioned to enable the securing members to pass into the material of the screen in order releasably to secure the plug of chosen size in a cell aligned with a damaged area of the screen.

BRIEF DESCRIPTION OF THE DRAWINGS

A plug forming a preferred embodiment of the invention will now be described, by way of example, with reference to the accompanying drawings in which.

DETAILED DESCRIPTION OF THE DRAWINGS

Figure 1:
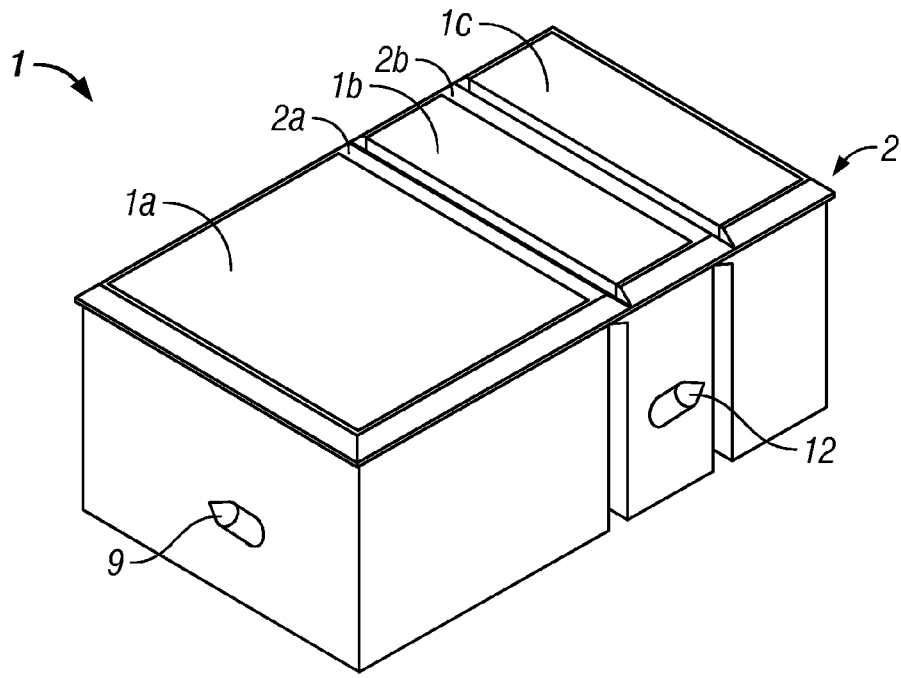
FIGS. 1 and 2 are isometric views of the plug.

The plug has a body 1 injection moulded from a rigid polyurethane plastics material around the upper peripheral edge of which is a co-moulded compressible seal 2 made from a polypropylene-based thermal plastic elastomer. The seal 2 is thus more compressible and more resilient than the body 1.

The body 1 is moulded to have the shape of three contiguous rectangular blocks 1a, 1b, 1c joined together by two integrally moulded webs 5, 6 defining lines of weakening extending across the upper surface of the body 1 which has a hollow underside.

The larger block 1a, of length 29 mm, has two internal thickenings through which extend, at an angle of 45° to the horizontal, respective holes 7 and 8 in the form of through bores for the passage of self-tapping screws 9.

The hole 8 opens through one shorter side wall of the body and the hole 7 opens through one longer side wall of the body.

The central or intermediate block 1b, of length 9.5 mm, has an internal thickening provided with a screw hole 10 which opens through the other longer side of the complete block for the passage of a self-tapping screw 12. The end block 1c, of length 10.5 mm, has an internal thickening provided with a screw hole 13 which opens through the other shorter side wall of the complete block for the passage of a self-tapping screw 14.

The plug body is shown in FIGS. 6 to 9. It can be seen that each block 1a, 1b, 1c is moulded with four side walls and that the blocks 1a, 1b are joined only along the line of weakening 5 extending laterally across the width of the upper surface of the plug. Below the line of weakening 5, the facing side walls of the blocks 1a, 1b are separated by a channel 15. Similarly, the blocks 1b, 1c are joined only along the line of weakening 6 extending laterally across the width of the upper surface of the plug. Below the line of weakening 6, the facing side walls of the blocks 1b, 1c are separated by a further channel 16.

The upper periphery of the body 1 is moulded with a step defining a right-angled recess 17 which extends around all four sides of the upper edges of the body 1. The upper surface of the body also has grooves overlying the webs defining the lines of weakening 5 and 6.

Figure 11:
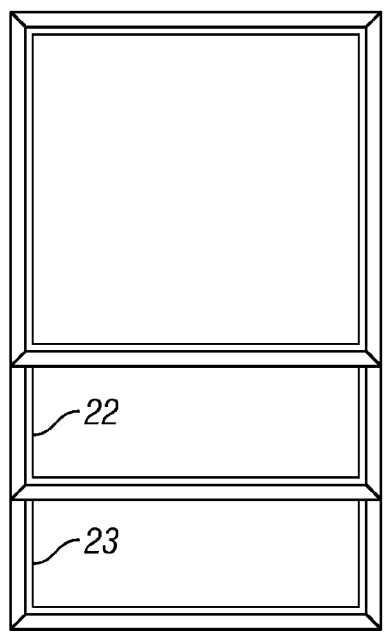
FIG. 11 is a plan view of the seal.
Figure 12:
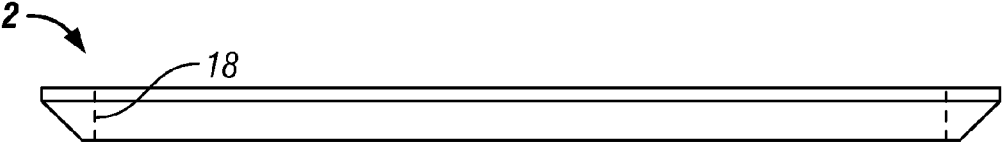
FIG. 12 is an end view of the seal.

The seal 2 (FIGS. 10 to 12) has a rectangular outer periphery with an inner edge 18 of right-angled cross-section which registers with and is secured in the right-angled recess 17 extending around the complete upper periphery of the plug body. The transverse intermediate length 2a, 2b (FIG. 1) of the seal 2 locate within the transverse grooves in the upper surface of the plug body 1. The upper and outer edge of the seal 2 has a sloping edge 19 as do the lengths 2a, 2b.

Figure 10:
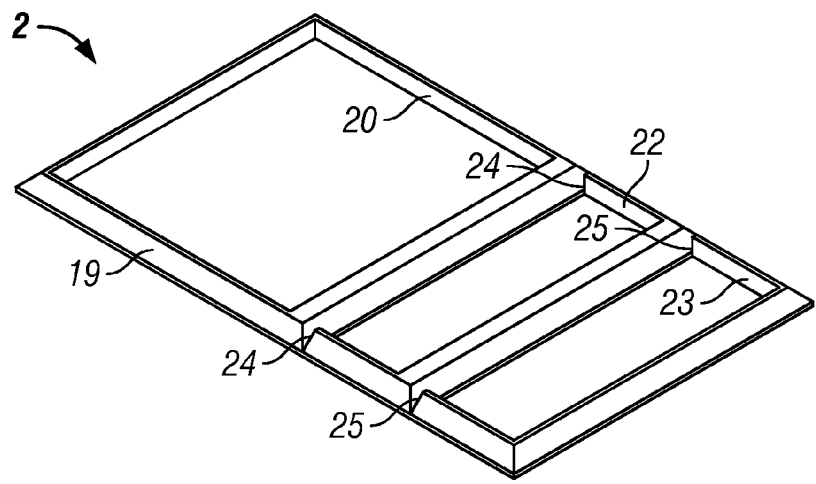
FIG. 10 is an isometric view of a seal of the plug.

Referring to FIG. 10, the complete seal 2 is formed by a main rectangle 20, corresponding in shape to the top of the block 1a, and two extensions 22 and 23 respectively corresponding in shape to the blocks 1b and 1c. It will be understood that one side of the rectangle 20 provides the length 2a and that the extension 22 provides the length 2b. The extension 22 is joined to the main rectangle by a pair of thin webs 24, and the extension 23 is joined to the extension 22 by a further pair of thin webs 25. The webs 24 overlie the line of weakening 5 and the webs 25 overly the line of weakening 6.

Figure 2:
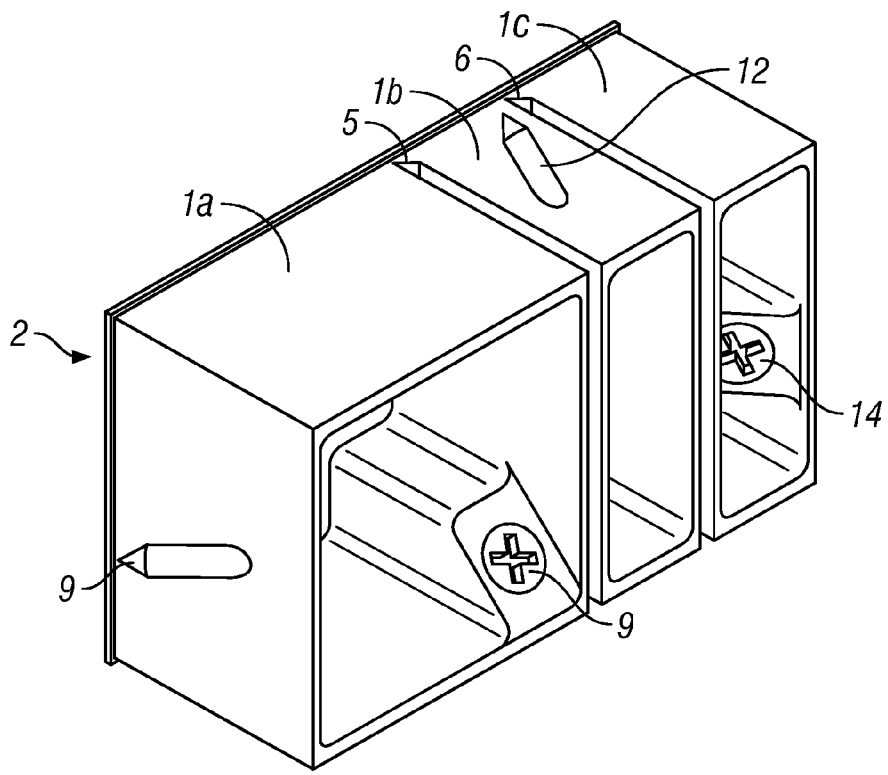
Figure 3:
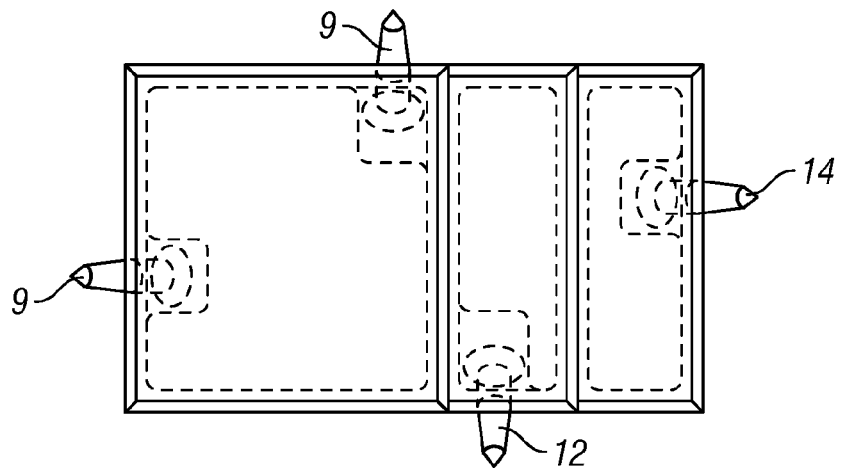
FIG. 3 is a plan view of the plug.
Figure 4:
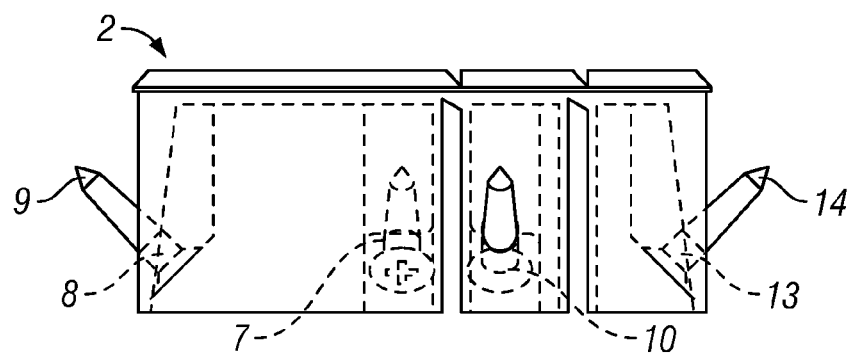
FIG. 4 is a side view of the plug.
Figure 5:
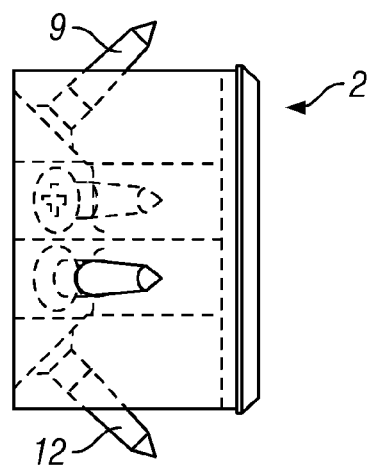
FIG. 5 is an end view of the plug.
Figure 6:
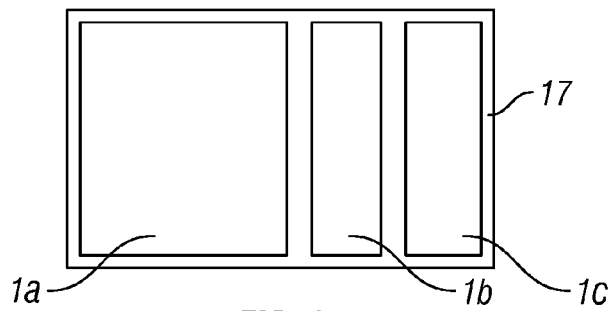
FIG. 6 is a plan view of a body of the plug.
Figure 7:
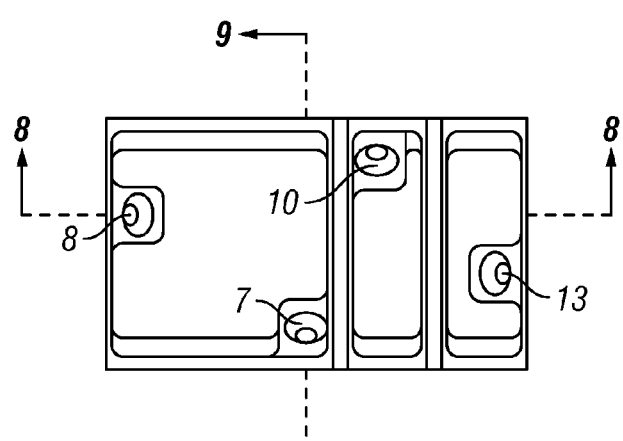
FIG. 7 is an underside view of the plug body.
Figure 8:
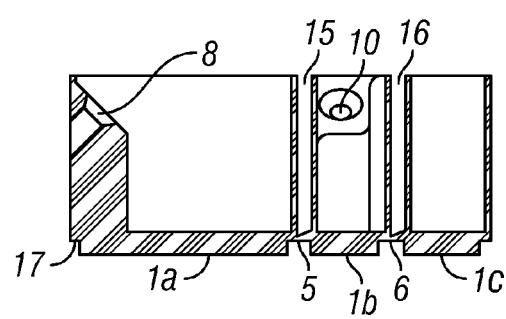
FIGS. 8 and 9 are sectional views on the lines VIII-VIII and IX-IX respectively of FIG. 7.
Figure 9:
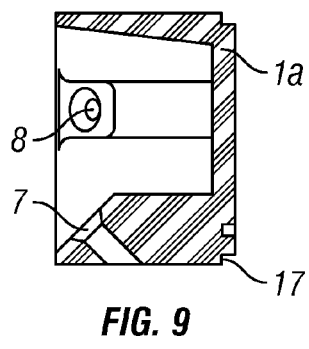

In the drawings, the body 1 and seal 2 are shown separately and they may be separately moulded and then attached together to form the complete plug, but the preferred method of manufacture is to co-mould the seal and body. In the complete plug, the seal projects from the plug, e.g. by a distance of the order of 2 mm, around the complete periphery of the upper edge of the plug. When the plug is in its initial and largest size, it is suitable to be inserted in a cell of a screen of a complementary shape and size. The plug is inserted in the cell underlying the damaged area of mesh, in a manner similar to that described in U.S. Pat. No. 6,872,466. However, in the case of the plug shown in the accompanying drawings, the compressible elastomeric seal 2 engages and seals against the co-operating surfaces of the screen so as to provide an effective seal between the screen and the plug so as to prevent passage of any particles through the cell which is thereby blanked off by the plug. Further, inserting the four self-tapping screws 9, 12 and 14 into the holes and then screwing them into the ribs of the screen provides a firm and secure attachment for the plug within the cell. The plug can be removed for replacement or reuse by simply releasing the screws and withdrawing the plug. The heads of the screws are accessible from the underside of the plug, as seen in FIG. 2 for the screws 9 and 14.

If it is desired to plug a cell of smaller length, the block 1c is snapped off (and discarded) by rupturing the line of weakening 6 and simultaneously breaking the webs 25. This gives a plug of shorter length but this shorter length plug retains an all-round seal which projects from the plug body around the complete periphery thereof. The complete periphery of the seal also presents a sloping outer edge of chamfered shape. This shorter length plug thus seals against the ribs of the screen with the same effectiveness as described for the plug of maximum length. Further, the shorter length plug has holes 7, 8 and 10 for the reception of three securing screws so can be detachably secured in the screen, in a manner similar to that described for the plug of maximum length.

By rupturing the line of weakening 5 and also the webs 24, the resultant plug has a minimum length for insertion into a cell of complementary shape, this minimum length plug again having an all round projecting seal with a sloping outer edge and holes 7 and 8 for two attachment screws 9 by which the plug can be detachably mounted in the screen.

Thus, a screen with cells of three different sizes can be repaired by use of the inventive universal plugs, without the cost of multiple plug tooling.

The seal 2 (shown separately from the plug body in FIGS. 9 to 11) is moulded in the shape of a rectangular frame, having an inner periphery with a right-angled sectional shape 17 which fits precisely in the right-angled edge recess 12 moulded in the upper edge of body 1. The upper and outer edge of the seal has a sloping edge 14.

In the drawings the body 1 and seal 2 are shown separately and they may be separately moulded and then attached together to form the complete plug, but the preferred method of manufacture is to co-mould the seal and body in a single moulding operation which not only moulds the body and seal to their required respective shapes but also bonds the seal firmly to the body to provide the complete plug.

To repair an area of damaged mesh in a screen, the plug is inserted in the cell underlying the damaged area of mesh, in a manner similar to that described in U.S. Pat. No. 6,872,466. However, in the case of the plug of FIGS. 1 to 11 the compressible elastomeric seal 2 engages and seals against co-operating surfaces of the screen so as to provide an effective seal between the screen and the plug so as to prevent the passage of any particles through the cell which is thereby blanked off by the plug. Further, inserting the self-tapping screws into the holes and then screwing them into the ribs provides a firm and secure attachment for the plug within the cell. The plug can be removed for replacement or re-use by simply releasing the screws.

The lines of weakening can be in any convenient form. They can be ruptured manually (e.g. by snap action, tearing or flexing) or by the use of a simple tool such as a knife or scissors.

The invention claimed is:

1. A plug for repairing a damaged sifting or filtering screen from only one side of the damaged screen, the plug comprising:
a body having a shape of a hollow rectangular block with four side walls defining a circumference, and having a first size;
an upper surface having a first size, wherein the four side walls are located in planes perpendicular to an upper surface wherein the four side walls are located in planes perpendicular to the upper surface and support the upper surface, wherein the upper surface has an edge that projects outwardly from the body and extends the entirety of the circumference thereof, wherein the upper surface and the edge form a seal with a first damaged cell of the damaged screen when the body and upper surface of the first size are inserted therein, and wherein the body has a line of weakening configured to rupture to transform the body and the upper surface into a second size wherein the second size of the body and the upper surface is different than the first size of the body and the upper surface so that the body and the upper surface are configured to plug a second damaged cell of the damaged screen having different dimensions than the first damaged cell, and corresponding to the second size of the body and the upper surface.

2. The plug according to claim 1, wherein the upper surface is spanned by the line of weakening.

3. The plug according to claim 1, wherein the upper surface is rectangular and has a transverse line of weakening wherein rupturing the transverse line of weakening yields the second size of the upper surface to correspond to the second size of the second damaged cell.

4. The plug according to claim 1, wherein the upper surface is rectangular and has a first transverse line of weakening and a second transverse line of weakening wherein rupturing the first transverse line of weakening yields an upper surface of intermediate length and rupturing the second transverse line of weakening yields an upper surface of minimum length, wherein the upper surface is configured to repair cells of three different sizes.

5. The plug according to claim 1, wherein the body is plastic and the line of weakening is defined by a thin web rupturable by a manual snapping action.

6. The plug according to claim 1, wherein the edge extends continuously around the entirety of the circumference of the body.

7. The plug according to claim 1, wherein the body is a first plastics material and the upper surface is a second plastics material which is more resilient than the first plastics material.

8. The plug according to claim 7, wherein the plug is formed by co-molding the body and the upper surface.

9. The plug according to claim 1, wherein each possible plug size has holes for the passage of securing members wherein the holes are positioned to enable the securing members to pass into the material of the screen to releasably secure the plug of chosen size in a cell aligned with the damaged area of the screen.

10. The plug according to claim 9, wherein the holes are angled upwardly and outwardly so that shanks of the securing members pass into the material of the screen and heads of the securing members are accessible from the underside of the body.

11. The plug according to claim 9, wherein the securing members are screws.

12. A method of repairing a damaged sifting or filtering screen from only one side of the damaged screen, wherein the screen is divided into a plurality of cells underlying a region of sifting mesh wherein the plurality of cells have different sizes, the method comprising:
   providing the plug of claim 1; and
   inserting the plug, without rupturing the plug along the line of weakening, into a suitably sized cell in a region of damaged screen to engage and seal the upper surface and the edge against the damaged screen.

13. A method of repairing a damaged sifting or filtering screen from only one side of the damaged screen, wherein the screen is divided into a plurality of cells underlying a region of sifting mesh wherein the plurality of cells have different sizes, the method comprising:
   providing the plug of claim 1;
   rupturing the plug along the line of weakening to produce two or more plug portions; and
   inserting at least one ruptured plug portion into a suitably sized cell in a region of damaged screen to engage and seal the upper surface and the edge against the damaged screen.

\* \* \* \* \*